United States Patent [19]

Umemura et al.

[11] Patent Number: 4,546,432

[45] Date of Patent: Oct. 8, 1985

[54] PROLOG PROCESSING SYSTEM

[75] Inventors: Mamoru Umemura; Minoru Yokota, both of Tokyo, Japan

[73] Assignee: NEC Corporation, Tokyo, Japan

[21] Appl. No.: 528,340

[22] Filed: Aug. 31, 1983

[30] Foreign Application Priority Data

Aug. 31, 1982 [JP] Japan .............................. 57-150831

[51] Int. Cl.⁴ .......................... G06F 9/00; G06F 9/06; G06F 7/00
[52] U.S. Cl. ................................... 364/200
[58] Field of Search ... 364/200 MS File, 900 MS File, 364/300 MS File

[56] References Cited

U.S. PATENT DOCUMENTS

| | | | |
|---|---|---|---|
| 2,939,120 | 5/1960 | Estrems et al. | 364/900 |
| 3,426,332 | 2/1969 | Cenfetelli | 364/200 |
| 3,955,180 | 5/1976 | Hirtle | 364/200 |
| 4,075,688 | 2/1978 | Lynch, Jr. et al. | 364/200 |
| 4,354,225 | 10/1982 | Frieder | 364/200 |
| 4,366,536 | 12/1982 | Kohn | 364/200 |
| 4,434,465 | 2/1984 | McDonough et al. | 364/200 |
| 4,438,512 | 3/1984 | Hartung et al. | 364/900 |
| 4,466,057 | 8/1984 | Houseman et al. | 364/200 |

*Primary Examiner*—James D. Thomas
*Assistant Examiner*—William G. Niessen
*Attorney, Agent, or Firm*—Sughrue, Mion, Zinn, Macpeak & Seas

[57] ABSTRACT

For a Prolog processor, a plurality of table entries are formed in a predetermined number of formats for storage in a program memory (21). Each table entry has a preselected number of fields which are related to the fields of at least one other table entry so that the table entries represent a Prolog program. A plurality of registers (26–28) are for storing, from time to time, various fields of the table entry read out of the program memory. Responsive to the fields of the read-out table entry, a control unit (25) controls a selector (22) for selecting one of the registers at a time to make the field stored in the selected register access the program memory for read out of another of the table entries.

3 Claims, 7 Drawing Figures

FIRST CLAUSE     P1(A,*X) ← P2(*X).
SECOND CLAUSE   P2(B).
THIRD CLAUSE     P3(C).
FOURTH CLAUSE   ← P1(A,*X).

FIG. 6 (1)

| STEP | TABLE ENTRY | R1 | R2 | R3 | REGISTER/ STACK | NEXT STEP |
|---|---|---|---|---|---|---|
| 1 | CT4 | NULL | NULL | BT4 |  | READ(R3) |
| 2 | BT4 | NULL | P1 | AT4·1 | P1→(PNR) | READ(R3) |
| 3 | AT4·1 | AT4·2 | A | UNCHANGED | A \| 0 | READ(R1) |
| 4 | AT4·2 | NULL | * | UNCHANGED | * \| 1 <br> A \| 0 | SEARCH OF PT BY USING (PNR) AS A KEY |
| 5 | PT1 | PT2 | P1 | CT1 |  | COINCIDENCE OF (R2) WITH (PNR): READ(R3) |
| 6 | CT1 | NULL | HT1·1 | BT1 |  | READ(R-2) |
| 7 | HT1·1 | HT1·2 | A | UNCHANGED | A \| 2 <br> * \| 1 <br> A \| 0 | READ(R1) |
| 8 | HT1·2 | NULL | * | UNCHANGED | * \| 3 <br> A \| 2 <br> * \| 1 <br> A \| 0 | COMPARISION OF 0 WITH 2 AND 1 WITH 3. IF COINCIDENT *→POINTER |
| 9 |  |  |  |  | 3 <br> A \| 2 <br> * \| 1 <br> A \| 0 | READ(R3) |

FIG. 6(2)

| STEP | TABLE ENTRY | R1 | R2 | R3 | REGISTER/STACK | NEXT STEP |
|---|---|---|---|---|---|---|
| 10 | BT1 | NULL | P2 | AT1 | P2→(PNR) | READ(R3) |
| 11 | AT1 | NULL | * | UNCHANGED | | SEARCH OF PT BY USING (PNR) AS A KEY |
| 12 | PT1 | PT2 | P1 | CT1 | | INCOINCIDENCE OF (R2) WITH (PNR): READ(R1) |
| 13 | PT2 | NULL | P2 | CT2 | | COINCIDENCE OF (R2) WITH (PNR): READ(R3) |
| 14 | CT2 | CT3 | HT2 | NULL | | READ(R2) |
| 15 | HT2 | NULL | B | UNCHANGED | | POP-UP OF STACK |

PROLOG PROCESSING SYSTEM

BACKGROUND OF THE INVENTION

This invention relates to an electronic digital computer and, more particularly, to a system for executing Prolog programs, namely, programs written in a programming language referred to in the art as Prolog (PROgramming in LOGic).

As will later be exemplified with reference to one of several figures of the accompanying drawing, a Prolog program is written as a sequence of clauses. For example, a clause is written as follows to describe that Jack likes fruits:

Likes(Jack, *things)←Fruits(*things).    (1)

In a clause, a dash with an arrowhead←is a logic symbol. The expressions on both sides of the logic symbol are called predicates, respectively. The word exemplified by "likes" and "fruits" are referred to herein as predicate names, respectively. The words "Jack" and "*things" are called arguments, respectively. The argument preceded by an asterisk * is a variable argument. The argument without the asterisk is a constant argument.

Each predicate represents an event and is defined by a predicate name and a permutation of one or more arguments. As will become clear as the description proceeds, it is important to direct attention to the order in which the arguments are arranged in a predicate. The word "permutation" is therefore used even when there is only one argument in a predicate.

The lefthand side of the logic symbol is called a head and the righthand side, a body. A clause may have only either the head or the body. A clause having both the head and the body, is called a regular clause. A clause having only the head, is called a declaratory clause. The head of each declaratory clause need not be followed by the logic symbol but directly by a stop. A clause having the body alone, is named an interrogatory clause. In each interrogatory clause, the body should be preceded by the logic symbol.

The predicate of the head and the predicate of the body are herein called a head predicate and a body precicate. The head of a regular or a declaratory clause consists of only one head predicate. It is therefore possible to refer to a head also as a head predicate. The body of a regular or an interrogatory clause consists of one or more body predicates. When a body consists of N predicates, a comma is interposed between two adjacent ones of the body predicates as:

Predicate H←Predicate 1, Predicate 2, ..., Predicate N.    (2)

In Clause (2), "Predicate H" represents a certain head predicate. "Predicate 1" through "Predicate N" represent body predicates, N in number. The comma used between the body predicates, is another logic symbol which means AND. Stated otherwise, the event represented by the head predicate is true only when all events represented by "Predicate 1" through "Predicate N" hold. Incidentally, it is possible to understand that a declaratory clause has zero body predicate and that an interrogatory clause, zero head predicate.

Let it be assumed that there is another clause in addition to Clause (1) such that:

Fruits(strawberry).    (3)

A sequence of Clauses (1) and (3) represents by the syllogistic deduction that Jack likes strawberry.

It is possible to execute a Prolog program by a conventional computer. Moreover, a higher-grade machine is known in the art, which is of an architecture capable of dealing with various programming languages. There is, however, no machine known which is effectively operable to execute Prolog programs.

SUMMARY OF THE INVENTION

It is therefore an object of the present invention to provide a system which is capable of effectively executing Prolog programs.

It is another object of this invention to provide a system of the type described, which is of a hardware structure capable of exclusively executing Prolog programs.

According to this invention, each Prolog program is represented for a program memory by a plurality of entries given in a predetermined number of formats. Each entry has first through F-th fields where F represents a preselected natural number which is greater than unity. The F-th fields of the entries represent the formats in which the respective entries are formed. In other words, the F-th fields serve as discriminators indicative of the respective formats. The first through the (F-1)-th fields of each entry indicate relationships which the entry under consideration has relative to different ones of the entries so that the entries altogether represent the program.

According to this invention, there is provided a system for executing a Prolog program, which system comprises a program memory comprising a plurality of memory addresses for storing entries, respectively. The entries are given in a predetermined number of formats. Each entry has first through F-th fields where F represents a preselected natural number which is greater than unity. The F-th fields of the entries represent the formats of the respective entries. The first through the (F-1)-th fields of the entries indicate relationships which each entry has relative to different ones of the entries so that the entries represent the program.

According to this invention, the system furthermore comprises accessing means for accessing the memory addresses one at a time, first through (F-1)-th pointer registers for storing the first through the (F-1)-th fields of one entry of the memory address accessed by the accessing means as first through (F-1)-th pointers, respectively, and selecting means responsive at least to the F-th field of the above-mentioned one entry for selecting one of the pointer registers at a time. The selecting means is coupled to the accessing means to make the accessing means access the memory addresses following the relationships indicated by the pointers of the successively selected ones of the pointer registers.

BRIEF DESCRIPTION OF THE DRAWING

FIGS. 6 (1) and (2) show steps of operation of the system shown in FIG. 2 for the program exemplified in FIG. 1.

DESCRIPTION OF THE PREFERRED EMBODIMENTS

Figures 1, 2:
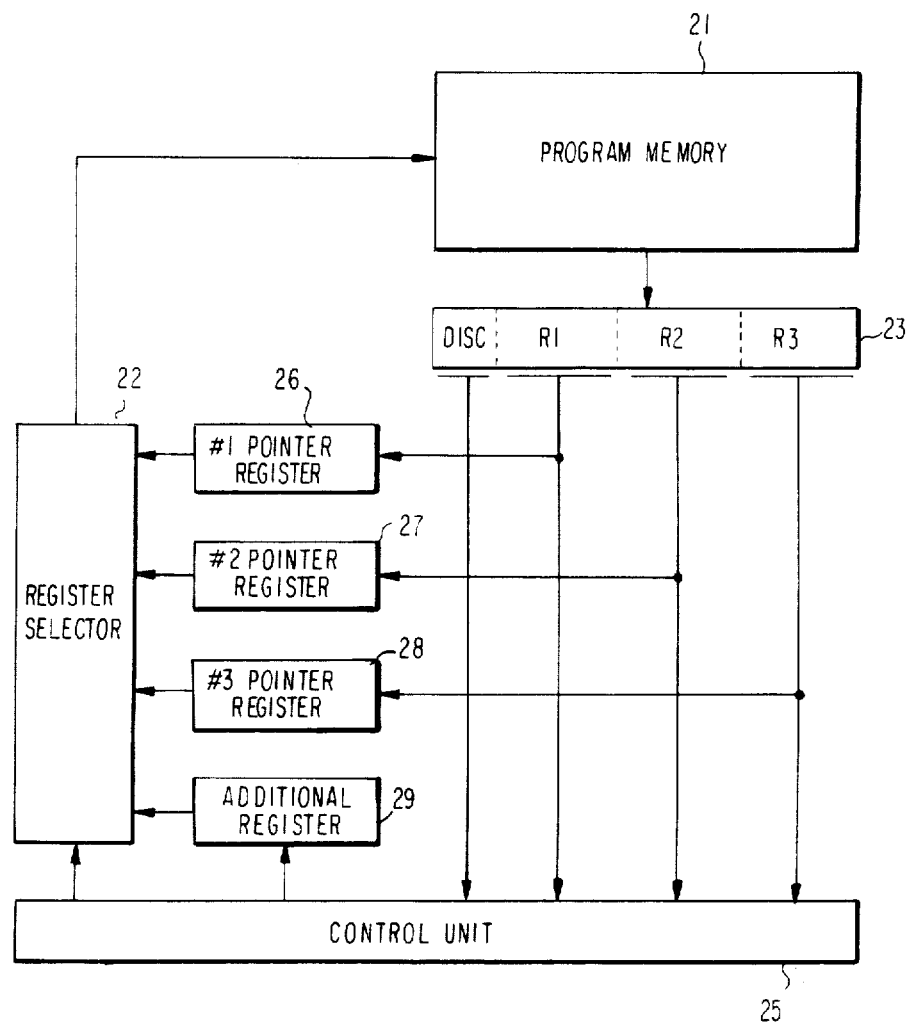
FIG. 1 exemplifies a Prolog program.
FIG. 2 is a block diagram of a system according to an embodiment of the instant invention.

Referring to FIG. 1, an example of Prolog programs will be described at first in order to facilitate an understanding of the present invention. The program is written as a sequence of first through fourth clauses. Only two predicate names P1 and P2 are used in the program, which will be called first and second predicate names, respectively. Four arguments A, B, C, and *X are used in the program, which will be named first through fourth arguments. In the example being illustrated, the first through the third arguments are constant arguments. In other words, the first through the third arguments have constant argument values or names. The fourth argument is a variable argument or has a variable argument value or name as indicated by an asterisk *.

The first clause is a regular clause. The first clause has a head predicate defined by the first predicate name and a permutation of the first and the fourth arguments. The first clause has a body which consists of only one body predicate defined by the second predicate name and the fourth argument.

The second and third clauses are declaratory clauses. The head predicate of the second clause is defined by the second predicate name and the second argument and the head predicate of the third clause, by the second predicate name and the third argument.

The fourth clause is an interrogatory clause. The body consists of only one body predicate, which is defined by the first predicate name and a permutation of the first and the fourth arguments. It may be mentioned here that a Prolog program includes at least one interrogatory clause and that the interrogatory clause or clauses define an interrogatory instruction.

Referring now to FIG. 2, a Prolog program executing system according to an embodiment of this invention comprises a program memory 21 for storing a Prolog program which is to be executed. As described heretobefore and will presently be described more in detail, the program is represented by a plurality of table entries or control words to be stored in memory addresses, respectively, which the program memory 21 comprises. The memory addresses are accessed one at a time by an address signal supplied from a register selector 22 as will later be described.

Figure 3:
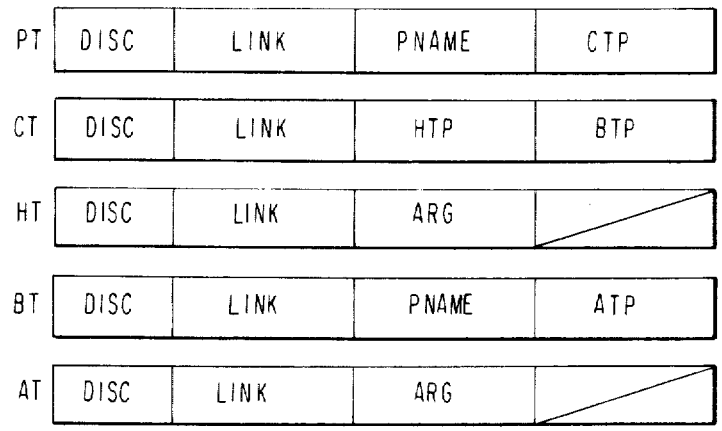
FIG. 3 shows table formats for the program exemplified in FIG. 1.

Turning to FIG. 3, each table entry is given in one of table formats of five types. The table formats are a process table format PT, a clause table format CT, a head table format HT, a body table format BT, and an argument table format AT. According to the table formats, each table entry has first through fourth fields. Merely for convenience of description, the field depicted for each table entry on the leftmost end of the figure, will be called the fourth field. The fields right to the fourth field of each table entry will successively be called the first through the third fields.

The fourth fields of the respective table entries serve as table or entry discriminators DISC indicative of the respective table formats. What are indicated by the first through the third fields of each table entry, depends primarily on the table format of that table entry and will soon be described. It may be mentioned here that each first field serves as a link indicator LINK of the nature which will shortly be described.

The table entries given in the process, the clause, the head, the body, and the argument table formats, will be referred to as process, clause, head, body, and argument table entries, respectively. As wil be described in the following in detail, the process table entries are formed for different or unique ones, respectively, of the predicate names used in the head predicates of the clauses. The clause table entries are formed for the respective clauses. The head table entries are formed for the respective arguments used in each of the head predicates of the clauses. The body table entries are formed for the respective predicate names used in each of the body predicates of the clauses. The argument table entries are formed for the respective arguments used in each of the the body predicates of the clauses.

Summarizing, the clause table entries represent the respective clauses. The process and the body table entries are linked to one another by the predicate names and may collectively be called predicate name table entries. The head and the argument table entries are related to one another by the argument values and may collectively be named argument value table entries. It is to be noted in this connection that the third argument is included only in the head predicate of the third clause. A head table entry formed for such an argument is related only to the head table entry under consideration.

Figure 4:
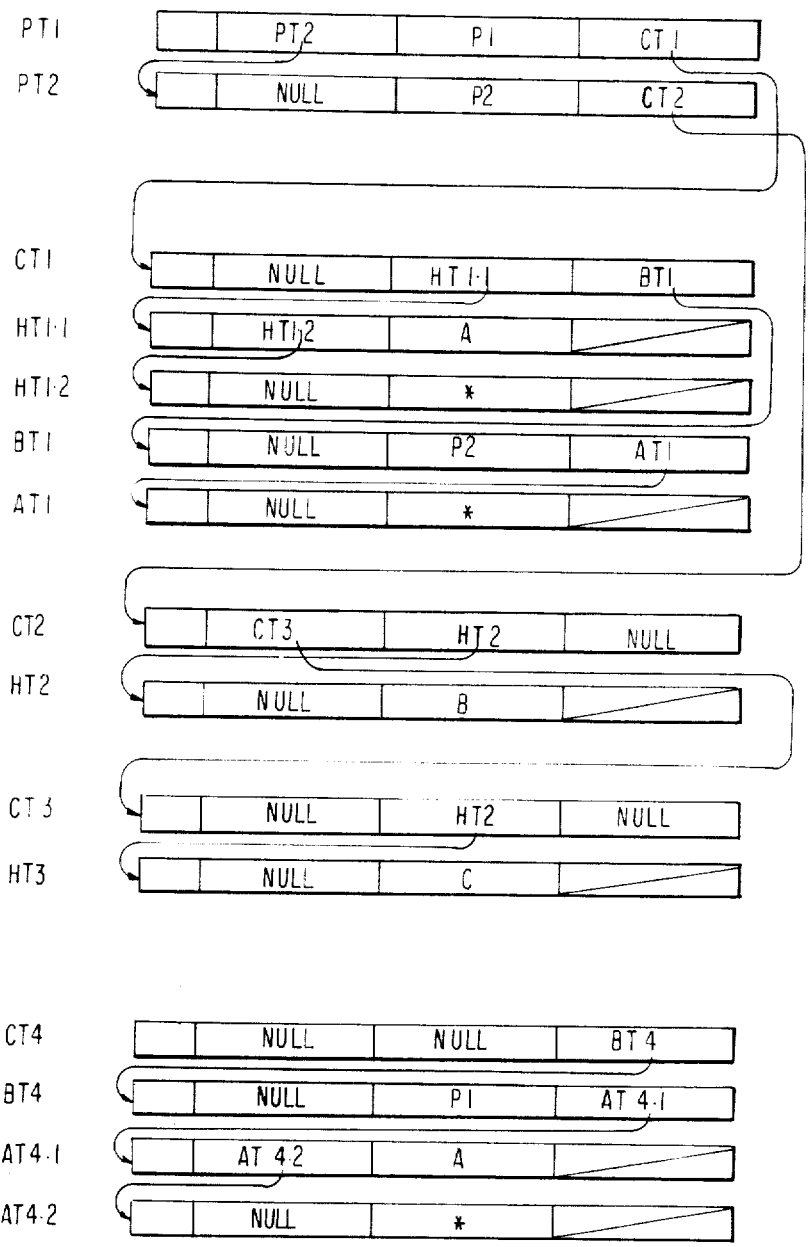
FIG. 4 shows a plurality of memory addresses which the system illustrated in FIG. 2 comprises and which are loaded with table entries of the formats depicted in FIG. 3.

Referring to FIG. 4 in addition to FIGS. 1 and 3, only first and second predicate names P1 and P2 are used as pointed out hereinabove throughout the program exemplified in FIG. 1. The different predicate names used in the head predicates of the clauses, are also the first and the second predicate names P1 and P2. First and second process table entries PT1 and HT2 are therefore formed for the first and the second predicate names P1 and P2, respectively, and stored in the program memory 21 (FIG. 2) at memory addresses which may be designated by PT1 and PT2, respectively, merely for simplicity of denotation.

It is possible in this manner to indicate the memory addresses of the program memory 21 by address numbers specified by sets of reference alphabets PT, CT, HT, BT, and AT for the respective table formats with addition thereto of single or double numerals, such as 1 and 1.1. It is possible to presume without loss of generality that the memory addresses are accessed in the ascending order of the numbers which are represented by the single and the double numeral added to each set of the reference alphabets. For instance, a memory address PT1 is accessed prior to another memory address PT2.

The first field, namely, the link indicator LINK (FIG. 3), of each process table entry indicates the memory address of another process table entry. More specifically, the link indicator of a process table entry represents one of the memory addresses that is accessed next subsequent to the memory address of the process table entry under consideration insofar as the process table entries are concerned. The fact that there are no other table entries of this kind, is indicated by a null code. It is possible to understand that the null code is also indicative of a memory address of "another" process table entry. Stated otherwise, the null code means that there is no other memory addresses of the process table entries.

According to the presumption, the first process table entry PT1 is accessed at first of all process table entries. The link indicator of the first process table entry PT1 therefore represents the memory address PT2 (FIG. 4) of another of the process table entries. The link indicator of the second process table entry PT2 gives the null code (FIG. 4).

The second field of each process table entry serves as a predicate name indicator PNAME (FIG. 3) indicative of the predicate name for which the process table entry in question is formed. The predicate name indicators of the first and the second process table entries PT1 and PT2 therefore represent the first and the second predicate names P1 and P2 (FIG. 4). As will become clear as the description proceeds, it is possible to understand that the predicate name indicotor PNAME indicates the memory address of another table entry.

The third field of each process table entry serves as a clause table indicator or pointer CTP (FIG. 3). It is necessary on clearly describing the clause table indicator to describe the clause table entries more in detail.

First through fourth clause table entries CT1 to CT4 are formed for the first through the fourth clauses, respectively. The first predicate name P1 is included only in the first clause insofar as the head predicate is concerned. The second predicate name P2 is included in common in the head predicates of the second and the third clauses. The memory address of the second clause table entry CT2 is the earliest of the memory adderses of the clause table entries for the clauses including the second predicate name P2 in common in the head predicates. More particularly, the second clause table entry CT2 is accessed prior to the third clause table entry CT3.

The clause table indicator CTP of the process table entry will now be described. The clause table indicator of a process table entry formed for each predicate name, represents the memory address of a clause table entry which is accessed the earliest of the clause table entries formed for the clauses including the predicate name under consideration in common in the head predicates. The clause table indicators of the first and the second process table entries PT1 and PT2 therefore indicate the memory addresses of the first and the second clause table entries CT1 and CT2 (FIG. 4), respectively.

Description will now be continued as regards the clause table entries. The link indicator LINK of a clause table entry formed for each clause including a predicate name in the head predicate, indicates the memory address of a clause table entry formed for another clause which also includes the predicate name in question in the head predicate. The link indicator of the first clause table entry CT1 is therefore the null code (FIG. 4). The link indicator of the second clause table entry CT2 indicates the memory address of the third clause table entry CT3 (FIG. 4). The link indicator of the third and the fourth clause table entries CT3 and CT4 are the null codes (FIG. 4).

The second and the third fields of each clause table entry serve as head and body table indicators or pointers HTP and HTP (FIG. 3), respectively. The head and the body table entries must therefore be described more in detail.

As remarked in conjunction with FIG. 1, two arguments are included in the head predicate of the first clause. Primary and secondary first head table entries HT1.1 and HT1.2 are therefore formed for the first clause. Similarly, second and third head table entries HT2 and HT3 are formed for the second and the third clauses, respectively. No head table entry is formed for the fourth clause which includes no head predicate.

Description of the head table entries will be continued. The two arguments included in the head predicate of the first clause, are referred to hereinabove as the first and the fourth argument A and *X. The primary first head table entry HT1.1 is formed for the first argument that stands foremost in the permutation. The secondary first head table entry HT1.2 is formed for the fourth argument that stands in the permutation next subsequent to the foremost standing argument.

The link indicator LINK of a head table entry formed for an argument comprised by a head predicate, indicates the memory address of a head table entry formed for another argument of the head predicate under consideration. Attention should be directed in this connection to the permutation of the argument(s). The "another" argument should be an argument that stands next following the first-mentioned argument in the permutation.

The first argument A in the head predicate of the first clause for which the primary first head table entry HT1.1 is formed, is next followed in the permutation in the head predicate in question by the fourth argument *X for which the secondary first table entry HT1.2 is formed. The fourth argument *X is followed in that head predicate by no argument. The link indicator of the primary and the secondary first table entries HT1.1 and HT1.2 therefore represent the memory address of the secondary first head table entry HT1.2 and the null code (FIG. 4), respectively. The link indicators of the second and the third head table entries HT2 and HT3 are the null codes (FIG. 4).

The second field of each head table entry serves as an argument value indicator or pointer ARG (FIG. 3) indicative of the argument for which the head table entry under consideration is formed. The argument value indicators of the primary and the secondary first head table entries HT1.1 and HT1.2 therefore represent the first and the fourth arguments A and * (FIG. 4), respectively. Inasmuch as the program includes only one variable argument, the fourth argument is designated merely by the asterisk. The argument value indicators of the second and the third head table entries HT2 and HT3 are representative of the second and the third arguments B and C (FIG. 4).

The third field of each head table entry is not used as indicated by a stroke in FIGS. 3 and 4.

A first body table entry BT1 is formed for the second predicate name P2 included in each of the body predicate(s) of the first clause. No body table entries are formed for the second and the third clauses which have no body predicate. If formed, the body table entries should be named second and third body table entries. A fourth body table entry BT4 is formed for the first predicate name P1 included in each of the body predicate(s) of the fourth clause.

Description of the body table entries will be continued. Like the link indicator LINK of each head table entry, the link indicator LINK of a body table entry formed for a predicate name of one of the body predicates of a clause, indicates the memory address of a body table entry formed for the predicate name of another of the body predicates of the clause under consideration. As described in connection with Clause (2) heretobefore, a plurality of body predicates of a clause are combined by AND into a body of the clause in question. The order of the body predicates in each clause is therefore immaterial. In the illustrated example, the link indicators of the first and the fourth body table entries BT1 and BT4 are the null codes (FIG. 4).

The second field of each body table entry serves as a predicate name indicator PNAME (FIG. 3) as in the process table entry. The predicate name indicator of a body table entry indicates the predicate name for which the body table entry is question is formed. The first and the fourth body table entries BT1 and BT4 therefore include predicate name indicators representative of the second and the first predicate names P2 and P1 (FIG. 4), respectively.

The third field of each body table entry serves as an argument table indicator or pointer ATP (FIG. 3). The argument table indicator will be described after the argument table entries are described later in the following.

Reverting to the description of clause table entries, the head table indicator HTP of a clause table entry represents the memory address of the earliest accessed one of the head table entries, such as HT1.1 and HT1.2, formed for the respective arguments of the head predicate of the clause for which the clause table entry under consideration is formed. In other words, the head table indicator of a clause table entry for a clause, represents the memory address of a head table entry formed for the argument which stands foremost in the permutation in the head predicate of the clause in question.

The head table indicator of the first clause table entry CT1 therefore indicates the memory address of the primary first head table entry HT1.1 (FIG. 4). The head table indicators of the second and the third clause table entries CT2 and CT3 represent the memory addresses of the second and the third head table entries HT2 and HT3 (FIG. 4). The head table indicator of the fourth clause table entry CT4 is the null code (FIG. 4). When the head table indicator HTP of a clause table entry gives the null code, the clause for which the clause table entry under consideration is formed, is an interrogatory clause.

Continuing the description of clause table entries, the body table indicator BTP of a clause table entry formed for a clause, represents the memory address of the body table entry that is formed for the predicate name of one of the body predicates of the clause under consideration. The body table indicator of the first clause table entry CT1 indicates the memory address of the first body table entry BT1 (FIG. 4). The body table indicators of the second and the third clause table entries CT2 and CT3 are the null codes (FIG. 4). The body table indicator of the fourth clause table entry CT4 represents the memory address of the fourth body table entry BT4 (FIG. 4). When the body table indicator BTP of a clause table entry is the null code, the clause for which the clause table entry in question is formed, is a declaratory clause.

Only one first argument table entry AT1 is formed for the argument(s) in the body predicate(s) of the first clause. No argument table entries are formed for the second and the third clauses. If formed, such argument table entries should be named second and third argument table entries. Primary and secondary fourth argument table entries AT4.1 and AT4.2 are formed for two arguments included in each of the body predicate(s) of the fourth clause. As described in conjunction with the first head table entries HT1's, the primary one is for the argument that stands foremost in the permutation of arguments of each body predicate. The secondary one is for the argument that next stands in the permutation.

The link indicator LINK of an argument table entry foremd for each argument of each body predicate, represents the memory address of an argument table entry for the argument that next follows the argument in question in the permutation of arguments in the body predicate under consideration. The first argument table entry AT1 therefore includes a link indicator of the null code (FIG. 4). The primary fourth argument table entry AT4.1 includes a link indicator representative of the memory address of the secondary fourth argument table entry AT4.2 (FIG. 4). The link indicator of the secondary fourth argument table entry AT4.2 is the null code (FIG. 4).

The second field of an argument table entry formed for each argument of each body predicate, serves as an argument value indicator ARG (FIG. 3) representative of the argument in question. The argument value indicator of the first argument table entry AT1 therefore indicates the fourth argument * (FIG. 4). The argument value indicators of the primary and the secondary fourth argument table entries AT4.1 and AT4.2 represent the first and the fourth arguments A and * (FIG. 4), respectively.

The third field of each argument table entry is not used as indicated by a stroke in FIGS. 3 and 4.

In FIG. 2, each table entry is read from the memory address accessed in the program memory 21 by the address signal into a read-out register 23 as a read-out table entry. The read-out register 23 has first through fourth fields for the first through the fourth fields of the read-out table entry, respectively. For brevity of description, the first through the third fields of the read-out table entry will be designated by R1, R2, and R3, respectively. As described with reference to FIG. 3, the first field R1 is a link indicator LINK. The second field R2 represents a predicate name indicator PNAME, an argument value indicator ARG, or a head table indicator HTP. The third field R3 indicates one of the clause, the body, and the argument table indicators CTP, BTP, and ATP. As the case may be, the third field R3 is idle as indicated by a stroke in FIGS. 3 and 4.

The first through the fourth fields of the read-out table entry are supplied to a control unit 25. The first through the third fields R1 to R3 are delivered towards first through third pointer registers 26, 27, and 28, respectively, and are stored therein as first through third pointers, respectively. For the purpose of storage, the control unit 25 may produce a pointer register set signal in the manner presently be described. Furthermore, the control unit 25 supplies the first through third register selection signals to the register selector 22 to make the same select the first through the third pointer registers 26 to 28, respectively. In addition, the control unit 25 feeds an additional register selection signal to the register selector 22 to make the same select an additional register 29, which is loaded with an address signal by the control unit 25. The register selector 22 thus selects one of the registers 26 through 29 at a time to deliver the contents of the selected register as the address signal to the program memory 21.

Execution of a Prolog program begins at an interrogatory instruction. Inasmuch as the program exemplified in FIG. 1 comprises only one interrogatory clause, the fourth clause table entry CT4 (FIG. 4) is processed at first.

It may be mentioned here that the program is represented by internal expressions which include pointers to the memory addresses in various fields as described with reference to FIGS. 3 and 4. A great number of steps are therefore necessary on executing the program by a conventional computer.

More particularly, a conventional computer comprises only one address register for a program memory. Furthermore, the memory address is specified by a specific field of each internal expression. It follows that a plurality of steps are indispensable on selecting each memory address from a plurality of fields and on storing the memory address in the address register.

In marked contrast, the Prolog program executing system exemplfied in FIG. 2 is capable of dealing with the internal expressions as they are. Moreover, provision of a plurality of registers makes it possible to effectively execute the program represented by such internal expressions.

Figure 5:
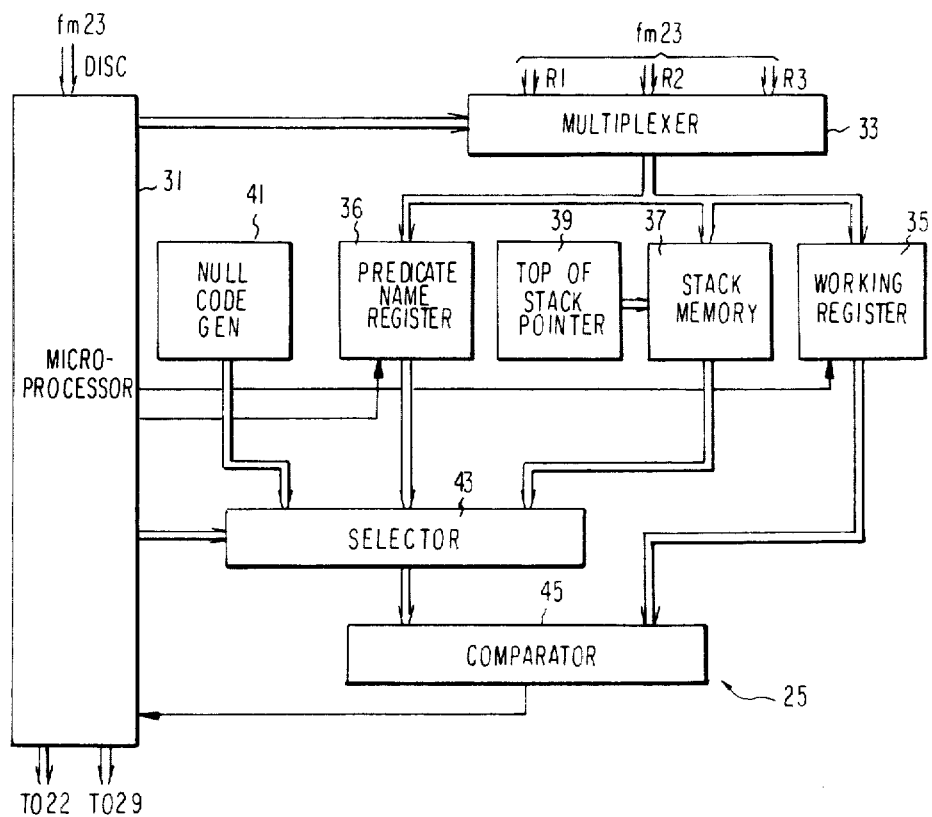
FIG. 5, drawn below FIG. 3 merely for convenience of illustration, is a block diagram of a control unit for use in the system depicted in FIG. 2.

Referring to FIG. 5, the control unit 25 may comprise a microprocesor 31 supplied with the fourth field of the read-out table entry from the read-out register 23 (FIG. 2) to decode the table discriminator DISC (FIG. 3). A multiplexer 33 is supplied with the first through the third fields R1 to R3 from the read-out register 23.

The microprocessor 31 is timed to deliver first through third multiplexer selection signal to the multiplexer 33 to make the same select the first through the third fields R1 to R3, respectively, as a multiplexer output signal. The multiplexer output signal is delivered towards a working register 35, a predicate name register 36, and a stack memory 37. The stack memory 37 has a plurality of stack addresses. One of the stack addresses is indicated as a top address by a top of stack pointer 39. It is possible in the manner known in the art to make the top of stack pointer 39 indicate the stack addresses 0, 1, 2, 3, 4, and so forth as the top address and to carry out push down of the stack memory 37. It is also possible to make the top of stack pointer 39 indicate a stack address to make the stack memory 37 produce a stack output signal.

Immediately after each of the first through the third multiplexer selection signals, the microprocessor 31 feeds a working register set signal to the working register 35 to set the multiplexer output signal therein. The working register 35 produces its content as a working register output signal.

When the table discriminator DISC indicates the body table format BT (FIG. 3), the microprocessor 31 produces a predicate name set signal immediately after the second multiplexer selection signal instead of the working register set signal. The predicate name set signal sets the second field R2 of each body table entry in the predicate name register 36. The second field R2 is what is produced by the multiplexer 33 and is the predicate name indicator PNAME (FIG. 3). The predicate name register 36 produces the predicate name indicator PNAME stored therein, as a predicate name output signal.

When the table discriminator DISC represents either of the head and the argument table formats HT and AT (FIG. 3), the multiplexer output signal produced in response to the second multiplexer selection signal, is stored in the stack memory 37 at the top address as well as in the working register 35. In this event, the multiplexer output signal is the argument value indicator ARG (FIG. 3) of the head or the argument table entry stored in the read-out register 23 as the read-out table entry. As the case may be, a variable argument is rewritten in the stack address into a stack address pointer as will later be described.

A null code generator 41 is for generating the null code as a null output signal. An internal selector 43 is supplied with the null code output signal of the null code generator 41, the predicate name output signal of the predicate name register 36, and the stack output signal of the stack memory 37. Immediately after each working register set signal, the microprocessor 31 produces a first internal selector selection signal to make the internal selector 43 select as a selector output signal the null code output signal. When the table discriminator DISC indicates the process table format PT (FIG. 3), the microprocessor 31 produces a second internal selector selection signal immediately after the working register set signal. The second internal selector selection signal makes the internal selector 43 produce the predicate name output signal as another selector output signal. When the table discriminator DISC represents the argument table format AT, the microprocessor 31 produces a third internal selector selection signal substantially concurrently with the working register set signal. The third internal selector selection signal makes the internal selector 43 select the stack output signal as still another selector output signal. As will later become clear, the microprocessor 31 may keep the first internal selector selection signal unless it temporarily switches the first internal selector selection signal to the second or the third internal selector selection signal.

A comparator 45 is for comparing the working register output signal of the working register 35 with the selector output signal of the internal selector 43. A comparison result signal thereby produced, is fed back to the microprocessor 31. The comparison result signal indicative of coincidence and incoincidence will be named a coincidence and an incoincidence signal. Whenever the comparison result signal indicates the incoincidence, the microprocessor 31 delivers the pointer register set signal to the first through the third pointer registers 26 to 28 (FIG. 2) through a connection (not shown).

For each table entry read out into the read-out register 23 from the program memory 21, the microprocessor 31 decodes the table discriminator DISC (FIG. 3) at first although the table discriminator is given in the "fourth" field of the read-out table entry. The microprocessor 31 holds the decoded table discriminator until the next following table discriminator is supplied thereto and decoded. Other operation of the microprocessor 31 will become clear from the following.

Referring now to FIG. 6 (FIGS. 6 (1) and (2)) together with FIGS. 2, 4, and 5, operation will be described for the program exemplified in FIG. 1 and represented by the table entries of the table formats illustrated with reference to FIG. 3. Merely for brevity of description, it is assumed that the microprocessor 31 has loaded the additional register 29 with an address signal indicative of the memory address of the fourth clause table entry CT4 (FIGS. 4 and 6) and has supplied the register selector 22 with the additional register selection signal. The address signal makes the program memory 21 produce the fourth clause table entry CT4, which is stored in the read-out register 23 as a read-out table entry.

In a first step 1 of operation (FIG. 6), the microprocessor 31 detects that the table discriminator DISC (FIG. 3) indicates the clause table format CT (FIG. 3).

The detected table discriminator is kept in the microprocessor 31 throughout the first step 1 of operation.

Responsive to the first multiplexer selection signal and the working register set signal produced by the microprocessor 31 in succession, the working register 35 is loaded with the null code given by the first field R1. Responsive to the first selector selection signal of the microprocessor 31, the comparator 45 is supplied with the null code output signal of the null code generator 41. The comparator 45 produces the coincidence signal, namely, the comparison result signal representative of coincidence. The comparison result signal is retained in the microprocessor 31 in addition to the detected table discriminator.

Responsive to the second multiplexer selection signal and the working register set signal, the second field R2 is substituted in the working register 35 for the first field R1. The second field R2 is, however, again the null code in the case of the fourth clause table entry CT4. The comparator 45 produces the coincidence signal. The comparison result signal is also kept in the microprocessor 31. The microprocessor 31 is informed of the fact that the head table indicator HTP (FIG. 3) is the null code, namely, that the fourth clause table entry CT4 is for an interrogatory clause.

Responsive to the third multiplexer selection signal and the working register set signal, the third field R3 is written in the working register 35. The third field R3 represents the memory address of the fourth body table entry BT4 (FIGS. 4 and 6). Responsive to the first selector selection signal, the comparator 45 produces the incoincidence signal. Responsive to the incoincidence signal, the microprocessor 31 produces the pointer register set signal to set the third field R3 in the third pointer register 28 as a pointer to the memory address of the fourth body table entry BT4.

As indicated in FIG. 6 by "next step," the microprocessor 31 responds to the table discriminator DISC indicative of the clause table format CT and the coincidence signal produced for the head table entry HTP (FIG. 3) and kept therein to supply the register selector 22 with the third register selection signal. The fourth body table entry BT4 is read from the program memory 21 into the read-out register 23 as a new read-out table entry.

In a second step 2 of operation, the microprocessor 31 detects the table discriminator DISC for the body table format BT (FIG. 3). The newly detected table discriminator is substituted in the microprocessor 31 for the table discriminator detected in the first step 1 of operation.

Responsive to the first multiplexer selection signal and the working register set signal, the previous content of the working register 35 is rewritten into the first field R1. Inasmuch as the first field R1 again gives the null code, the comparator produces the coincidence signal. The comparison result signal is retained in the microprocessor 31 until the steps come to an end for the interrogatory clause dealt with during the first step 1 of operation. It is to be noted that the comparison result signal is kept in the microprocessor 31 although a like comparison result signal indicative of the coincidence or the incoincidence is produced for the link indicator LINK (FIG. 3) of each table entry read into the read-out register 23 and retained in the microprocessor 31 during each step of operation.

Inasmuch as the retained table discriminator indicates the body table format BT, the microprocessor 31 makes the predicate name set signal follow the second multiplexer selection signal and does not produce the working register set signal. The predicate name register 36 is loaded with the second field R2 representative of the first predicate name P1.

Responsive to the third multiplexer selection signal and the working register set signal, the third field R3 is set in the working register 35. Inasmuch as the third field R3 indicates the memory address of the primary fourth argument table entry AT4.1, the comparator 45 produces the incoincidence signal. The pointer register set signal rewrites the previous pointer in the third signal register 28 into a new pointer to the memory address of the primary fourth argument table entry AT4.1.

The above-described fact that the first predicate name P1 is set in the predicate name register 36, is indicated in FIG. 6 by "P1→(PNR)." For the next step, the microprocessor 31 responds to the table discriminator DISC representative of the body table format BT and sends the third register selection signal to the register selector 22. The primary fourth argument table entry AT4.1 is stored in the read-out register 23.

In a third step 3 of operation, the microprocessor 31 detects the table discriminator DISC representative of the argument table format AT (FIG. 3). As before, the newly detected table discriminator is substituted in the microprocessor 31 for the previously detected and retained table discriminator.

Responsive to the first multiplexer selection signal and the working register set signal, the first field R1 is stored in the working register 35. Inasmuch as the first field R1 indicates the memory address of the secondary fourth argument table entry AT4.2, the comparator 45 produces the incoindence signal. The comparison result signal indicative of the incoincidence is retained in the microprocessor 31 during the third step 3 of operation in addition to the comparison result signal produced in the second step 2 of operation for the link indicator LINK. The pointer register set signal sets the first field R1 in the first pointer register 26.

Responsive to the second multiplexer selection signal and the working register set signal, the second field R2 is set in the working register 25. Inasmuch as the table discriminator retained in the microprocessor 31 indicates the argument table format AT, the microprocessor 31 produces the third selector selection signal rather than the first selector selection signal. No signal is stored as yet in the stack memory 37. The comparator 45 therefore produces the incoincidence signal. The table discriminator for the argument table format AT makes the second multiplexer selection signal store the second field R2 in the stack memory 37 at the stack address 0 indicated by the top of stack pointer 39. The second field R2 represents the first argument A.

Inasmuch as the third field R3 is idle, the third pointer register 28 keeps the pointer to the memory address of the primary fourth argument table entry AT4.1 unchanged.

The above-mentioned fact that the argument A is stored in the stack address 0, is indicated in FIG. 6 by " A 0". For the next step, the microprocessor 31 responds to the table discriminator DISC representative of the argument table format AT and the incoincidence signal produced for the first field R1 and kept therein to deliver the first register selection signal to the register selector 22. The secondary fourth argument table entry AT4.2 is stored in the read-out register 23.

In a fourth step 4 of operation, the microprocessor 31 detects that the table discriminator DISC again indicates the argument table format AT. The table discriminator indicative of the argument table format AT is retained in the microprocessor 31.

Responsive to the first multiplexer selection signal and the working register set signal, the first field R1 is set in the working register 35. The first field R1 gives the null code. The comparator 45 therefore produces the coincidence signal.

Inasmuch as the table dissriminator kept in the microprocessor 31 indicates the argument table format AT, the second multiplexer selection signal stores the second field R2 in the stack memory 37 at the stack address 1. The first argument A stored in the stack address 0 is pushed down. The second field R2 stored in the stack address 1 represents the fourth argument *.

As described before, the pointer to the memory address of the primary fourth argument table entry AT4.1 is still kept unchanged in the third pointer register 28. The pointer to the primary fourth argument table AT4.1 is, however, already used before beginning of the fourth step 4 of operation and is no more used.

For the next step, the microprocessor 31 responds to the table discriminator DISC for the argument table format AT and the coincidence signal produced for the first field R1 and kept therein to load the additional register 29 with an address signal representative of the memory address of the first process table entry PT1. Furthermore, the microprocessor 31 delivers the additional register selection signal to the register selector 22. The first process table entry PT1 is read into the read-out register 23. It is possible to understand that this is to check whether or not the predicate name indicator PNAME (FIG. 3) given by the second field R2 of the fourth body table entry BT4 and stored in the predicate name register 26, is coincident with the predicate name indicator PNAME given in the first process table entry PT1. The check is indicated in FIG. 6 by "search of PT [process table entries] by using (PNR) as a key."

In a fifth step 5 of operation, the microprocessor 31 detects that the table discriminator DISC is for the process table format PT (FIG. 3). The table discriminator kept in the microprocessor 31 is changed from that for the argument table format AT to the newly detected one for the process table format PT.

The first field R1 is not a null code. The comparator 45 therefore supplies the microprocessor 31 with the incoincidence signal. The microprocessor 31 produces the pointer register set signal, which loads the first field R1 in the first pointer register 26. The first field R1 represents the memory address of the second process table entry PT2.

Responsive to the second multiplexer selection signal and the working register set signal, the second field R2 is set in the working register 35. Inasmuch as the retained table discriminator is for the process table format PT, the microprocessor 31 produces the second selector selection signal rather than the first selector selection signal. The comparator 45 compares the working register output signal of the working register 35 with the predicate name output signal of the predicate name register 36. Both represent the first predicate name P1. The comparator 45 produces the coincidence signal. The comparison result signal is also retained in the microprocessor 31.

Responsive to the incoincidence signal produced for the third field R3, the microprocessor 31 produces the pointer register set signal to store the third field R3 in the third pointer register 28. The third field R3 represents the memory address of the first clause table entry CT1.

The above-described fact that the coincidence is detected between the predicate name represented by the second field R2 and the predicate name indicator PNAME stored in the predicate name register 36, is indicated in FIG. 6 by "coincidence of (R2) with (PNR)." For the next step, the microprocessor 31 responds to the table discriminator DISC for the process table format PT and the coincidence signal produced for the second field R2 to supply the register selector 22 with the third register selection signal rather than with the first register selection signal. The first clause table entry CT1 is read into the read-out register 23.

In a sixth step 6 of operation, the microprocessor 31 detects the table discriminator DISC for the clause table format CT. The microprocessor 31 keeps the table discriminator of the clause table format CT in place of the previously detected table discriminator for the process table format PT.

The first field R1 gives the null code. The comparator 45 produces the coincidence signal.

The second field R2 is, however, not a null code. The comparator 45 supplies the microprocessor 31 with the incoincidence signal. The microprocessor 31 produces the pointer register set signal to store the second field R2 in the second pointer register 27. The second field R2 represents the memory address of the primary first head table entry HT1.1.

As in the first step 1 of operation, the null code output signal of the null code generator 41 is compared with the third field R3 selected by the third multiplexer selection signal. The comparator 45 produces the incoincidence signal. The microprocessor 31 produces the pointer register set signal to set the third field R3 in the third pointer register 28. The third field R3 indicates the memory address of the first body table entry BT1.

The table discriminator DISC retained in the microprocessor 31, indicates the clause table format CT. The second field R2 is, however, not a null code. The microprocessor 31 therefore produces the second register selection signal for the next step rather than the third register selection signal. The primary first head table entry HT1.1 is read into the read-out register 23.

In a seventh step 7 of operation, the microprocessor 31 detects the table discriminator DISC for the head table format HT (FIG. 3). The table discriminator indicative of the head table format HT is now retained in the microprocessor 31.

The first field R1 is not a null code. The comparator 45 produces the incoincidence signal. The microprocessor 31 produces the pointer register set signal to store the first field R1 in the first pointer register 26. The first field R1 represents the memory address of the secondary first head table entry HT1.2.

As is the case with the third step 3 of oberation, the second multiplexer selection signal stores the second field R2 in the stack memory 37 at the stack address 2. The second field R2 represents the fourth argument *.

Inasmuch as the third field R3 is idle, the third pointer register 28 keeps the address signal for the first body table entry BT1 unchanged. The pointer kept in the third pointer register 28 is used later in the following.

The stack memory 37 is loaded with the first argument A, the fourth argument *, and again the first argument A in the stack addresses 0, 1, and 2, respectively. For the next step, the microprocessor 31 responds to the table discriminator DISC for the head table format HT and the incoincidence signal produced for the first field R1 and kept therein to supply the register selector 22 with the first register selection signal. The secondary first head table entry HT1.2 is read into the read-out register 23.

In an eighth step 8 of operation, the microprocessor 31 again detects the table discriminator DISC for the head table format HT.

The first field R1 is the null code. The comparator 45 produces the coincidence signal.

Again like in the third step 3 of operation, the microprocessor 31 produces the second multiplexer selection signal and the working register set signal. The microprocessor 31 furthermore produces the third selector selection signal. The second field R2 is stet in the working register 35 and is compared with the argument A stored in the stack address 2. The comparator 45 produces the incoincidence signal. The second field R2 selected by the second multiplexer selection signal, is stored in the stack memory 37 at the stack address 3. The contents in the stack addresses 0 through 2 are pushed down.

The third field R3 is idle. The third pointer register 28 still keeps the memory address of the first body table entry BT1 unchanged.

The stack memory 37 is loaded with the first argument A, the fourth argument *, again the first argument A, and again the fourth argument * in the stack addresses 0, 1, 2, and 3, respectively. It is to be noted that the microprocessor 31 now retains, among others, the table discriminator DISC for the argument table format AT and the coincidence signal produced for the first field R1. The next step is to compare contents of the stack addresses 0 and 2 with contents of the stack addresses 1 and 3, respectively. If the contents are coincident, the variable argument * stored in the stack address 3 is rewritten into a stack address pointer to the stack address 1 in the manner known in the art.

In a ninth step 9 of operation, the microprocessor 31 carries out the comparison. Inasmuch as the coincidence holds between the contents of the stack addresses 0 and 2 and between the contents of the stack addresses 1 and 3, the content of the stack address 3 is rewritten into the pointer to the stack address 1 as symbolically depicted in FIG. 6. The microprocessor 31 furthermore responds for the next step to the table discriminator DISC for the argument table format AT and the coincidence signal produced for the first field R1 to supply the third register selection signal to the register selector 22. The first body table entry BT1 is now stored in the read-out register 23.

In a tenth step 10 of operation, the table discriminator DISC for the body table format BT is detected by the microprocessor 31 and retained therein. The second predicate name P2 is substituted in the predicate name register 36 for the first predicate name P1. The third field R3 is not a null code and is therefore stored in the third pointer register 28. The third field R3 indicates the memory address of the first argument table entry AT1.

The above-described storage of the second predicate name P2 in the predicate name register 36, is indicated in FIG. 6 by "P2→(PNR)." The contents of the stack memory 37 are not different from those obtained in the ninth step 9 of operation. For the next step, the microprocessor 31 responds to the table discriminator DISC indicative of the body table format BT to deliver the third register selection signal to the register selector 22.

In an eleventh step 11 of operation, the table discriminator DISC for the argument table format AT is sensed by the microprocessor 31 and kept therein. After storage of the second field R2 in the working register 35, the microprocessor 31 produces the third selector selection signal to select the stack output signal, namely, the content of the stack memory 37. The pointer stored in the stack address 3 points to the fourth argument * stored in the stack address 1. The second field R2 selected by the second multiplexer selection signal, is therefore stored in the stack address 4 as a stack address pointer to the stack address 3.

Inasmuch as the third field R3 is idle, the third pointer register 28 keeps the memory address of the first argument table entry AT1 unchanged. As described in conjunction with the third step 3 of operation, the content of the third pointer register 28 is already used and is for no further use. The contents of the stack memory 37 are symbolically depicted in FIG. 6.

As in the fourth step 4 of operation, the microprocessor 31 keeps the table discriminator DISC for the argument table format AT and the null code given by the first field R1 and represented by the coincidence signal. For the next step, the microprocessor 31 behaves as described before. As a result, the microprocessor 31 loads the additional register 29 with the address signal for the first process table entry PT1 and feeds the additional register selection signal to the register selector 22. The first process table entry PT1 is read into the read-out register 23. This is also to search the process table entries PT1 and PT2 for the second predicate name P2, namely, by using the content of the predicate name register 36 as a key.

In a twelfth step 12 of operation, the first process table entry PT1 is checked as in the fifth step 5 of operation. The second selector selection signal is produced immediately after storage of the second field R2 in the working register 35. The second field R2 represents the first predicate name P1. The predicate name output signal gives the second predicate name P2. The comparator 45 therefore produces the incoincidence signal, which is kept in the microprocessor 31 as usual.

Although the third pointer register 28 is loaded with the third field R3 indicative of the memory address of the first clause table entry CT1, the content of the third pointer register 28 is not used at all. For the next step, the microprocessor 31 responds to the table discriminator DISC for the process table format PT and the incoincidence signal kept therein for the second field R2 to supply the register selector 22 with the first register selection signal rather than with the third register selection signal. The second process table entry PT2 is read into the read-out register 23.

In a thirteenth step 13 of operation, the microprocessor 31 retains the table discriminator DISC for the process table format PT and also the coincidence signal produced for the null code given by the first field R1. The coincidence signal produced for the second predicate name P2 represented by the second field R2 is furthermore retained in the microprocessor 31.

The incoincidence signal produced for the third field R3, makes the microprocessor 31 produce the pointer register set signal to store the third field R3 in the third pointer register 28. The third field R3 points to the memory address of the second clause table entry CT2.

For the next step, the microprocessor 31 responds to the table discriminator DISC for the process table format PT and the coincidence signal produced for the second predicate name P2. As in the fifth step 5 of operation, the microprocessor 31 produces the third register selection signal. The second clause table entry CT2 is read into the read-out register 23.

In a fourteenth step 14 of operation, the microprocessor 31 retains the incoincidence signals produced for the first and the second fields R1 and R2. In the meanwhile, the first and the second fields R1 and R2 are stored in the first and the second pointer registers 26 and 27, respectively. The first field R1 represents the memory address of the third clause table entry CT3. The second field R2 is for the memory address of the second head table entry HT2.

The third field R3 gives the null code. The comparator 45 therefore produces the coincidence signal. The coincidence signal indicates that the second clause table entry CT2 is for a declaratory clause. The coincidence signal which represents a declaratory clause, namely, which is produced for the third field R3 of a table entry of the clause table format CT, is retained in the microprocessor 31 so as to control the next following step(s) as will become clear as the description pruceeds.

For the next step, the microprocessor 31 responds to the table discriminator DISC for the clause table format CT and the incoincidence signal produced for the second field R2 to supply the register selector 22 with the second register selection signal rather than with the third register selection signal. The second head table entry HT2 is read into the read-out register 23. In the example being illustrated, the content of the first pointer register 26 is not used.

In a fifteenth step 15 of operation, the microprocessor 21 detects the table discriminator DISC indicative of the head table format HT. The null code given in the first field R1, is detected as the coincidence signal.

The second field R2 represents the second argument B. The second multiplexer selection signal stores the second field R2 in the stack memory 37.

The second argument B is bound to the variable argument * stored in the stack address 1 as indicated by the stack address pointers in FIG. 6. The stack memory 37 is popped up.

The null code detected in the fourteenth step 14 of operation to represent a declaratory clause, indicates that operation for the program exemplified in FIG. 1, is near to an end. After the fifteenth step 15 of operation, check is carried out for the link indicator LINK sensed in the second step 2 of operation and retained as the comparison result signal in the microprocessor 31. The comparison result signal indicates in the example being illustrated that the link indicator LINK gives the null code. This means as will be discussed in the following that there is no other body predicate in the interrogatory clause dealt with in the first step 1 of operation. Execution is complete for the program exemplified in FIG. 1.

In connection with the operation described heretobefore with reference to FIG. 6 and other figures, it should be noted that the interrogatory clause may comprise two or more body predicates. In this event, the program includes a plurality of body table entries for the respective body predicates of the interrogatory clause. By way of example, the fourth body table entry BT4 (FIGS. 4 and 6) consists of primary and secondary fourth body table entries BT4.1 and BT4.2 (not shown).

In contrast to the single fourth body table entry BT4 which includes the null code (FIGS. 4 and 6) in the first field as the link indicator LINK (FIG. 3), the link indicator LINK of the primary fourth body table entry BT4.1 points to the memory address of the secondary fourth body table entry BT4.2. In the second step 2 of operation, the pointer to the secondary fourth body table entry BT4.2 is not only stored in the first pointer register 26 but also retained in the microprocessor 31 together with the comparison result signal produced therefor. After the fifteenth step 15 of operation, the microprocessor 31 stores the pointer to the secondary fourth body table entry BT4.2 in the additional register 29. The second through the fifteenth steps 2 to 15 of operation are repeatedly carried out for the second body predicate of the interrogatory clause.

It is now understood that a Prolog program is executed by repeating the following steps A and B.

In the step A, attention is directed to a clause A comprising the body predicate that includes a predicate name P. Search in carried out for another clause B which has a head including the predicate name P. The argument(s) of the body predicate and of the head predicate are compared with each other in the order of the respective permutations. When a variable and a constant argument are found during the comparison in one and the other of the predicates, respectively, the constant argument is bound to the variable argument. When two variable arguments of a common argument name, such as *X, are found during the comparison, one is changed to a pointer to the other so that a single constant argument may later be bound to the both.

For the step B, let it be surmised that the comparison has resulted in a coincident clause C having a head predicate coincident with the body predicate which the clause A comprises. When the coincident clause C comprises a body predicate, the body predicate is processed as described in connection with the step A. When the clause C has no body predicate, operation comes to an end for the body predicate of the clause A. If the clause A has no other body predicate, execution is complete. If the clause A has at least one other body precitate, the above-mentioned steps A and B are repeated.

It will now readily be feasible for one skilled in the art to program the microprocessor 31 with reference to the operation thus far described. Various modifications are possible to the steps of operation. For example, the structure illustrated with reference to FIGS. 2 and 5, is capable of automatically searching for the clause table entry for an interrogatory clause, starting at a certain one of the table entries, as from the first process table entry PT1 (FIGS. 4 and 6). Above all, it should clearly be understood that the first through the third pointer registers 26 to 28 may be loaded with the first through the third fields R1 to R3 of each read-out table entry because the register selector 22 selects only one of the registers 26 through 28 or 26 through 29 at a time.

It may finally be mentioned as regards execution of a Prolog program that it may be impossible to find at first a clause comprising a head predicate defined by a predicate name which also defines a body predicate of a previously processed clause. If a failure occurs in thim manner, resort should be had to the blacktracking as called in the art. For this purpose, it is preferred that the control unit 25 exemplified in FIG. 5 should comprise additional internal registers (not shown).

What is claimed is:

1. A system for executing a Prolog program, said system comprising:

a program memory comprising a plurality of memory addresses for storing entries, respectively, said entries being given in a predetermined number of formats, each entry having first through F-th fields where F represents a preselected natural number which is greater than unity, the F-th fields of said entries representing the formats of the respective entries, the first through the (F-1)-th fields of said entries indicating relationships which each entry has relative to different ones of said entries so that said entries represent said program;

accessing means for accessing said memory addresses one at a time;

first through (F-1)-th poniter registers for storing the first through the (F-1)-th fields of the entry of the memory address accessed by said accessing means as first through (F-1)-th pointers, respectively; and selecting means responsive to at least the F-th field of said one entry for selecting one of said pointer registers at a time, said selecting means being coupled to said accessing means to make said accessing means access the memory addresses following the relationships indicated by the pointers of the successively selected ones of said pointer registers.

2. A system as claimed in claim 1, said program being represented by a plurality of clauses, each clause consisting of $n_1$ head predicate and $n_2$ body predicate where $n_1$ represents one of zero and unity, $n_2$ represents one of zero through a natural number, and a sum of $n_1$ and $n_2$ is not equal to zero, each of the head and the body predicates of said clauses being defined by a predicate name and a permutation of at least one argument, the body predicate of one of said clauses comprising the predicate name of the head predicate of at least one of those of said clauses which are different from said one of the clauses, wherein:

said formats consist of first through third formats;

said entries consisting of clause table entries formed in said first format for the respective clauses, predicate name table entries formed in said second format for the respective predicate names in said head and said body predicates, and argument value table entries formed for the respective arguments in each of the head and the body predicates of said clauses, a first predetermined one of the first through the (F-1)-th fields of each clause table entry indicating the relationship to said predicate name table entries, a second predetermined one of the first through the (F-1)-th fields of each clause table entry indicating the relationship to said argument value table entries.

3. A system as claimed in claim 1, said program being represented by a plurality of clauses, said clause consisting of $n_1$ head predicate and $n_2$ body predicate where $n_1$ represents one of zero and unity, $n_2$ represents one of zero through a natural number, and a sum of $n_1$ and $n_2$ is not equal to zero, each of the head and the body predicates of said clauses being defined by a predicate name and a permutation of at least one argument, the body predicate of one of said clauses comprising the predicate name of the head predicate of at least one of those of said clauses which are different from said one of the clauses, wherein:

said formats consist of a process table format, a clause table format, a head table format, a body table format, and an argument table format;

said preselected natural number F being four;

said entries consisting of:

process table entries formed in said process table format for different ones, respectively, of the predicate names included in the head predicates of said clauses;

clause table entries formed in said clause table format for the respective clauses;

head table entries formed in said head table format for the respective arguments used in each of the head predicates of said clauses;

body table entries formed in said body table format for the respective predicate names included in each of the body predicates of said clauses; and argument table entries formed in said argument table format for the respective arguments used in each of the body predicates of said clauses;

the first through the third fields of the process table entry formed for each predicate name indicating the memory address of another of said process table entries, the last-mentioned predicate name, and the memory address of one of the clause table entries formed for the clauses comprising the last-mentioned predicate name in common in the head predicates;

the first field of the clause table entry formed for each clause indicating the memory address of the clause table entry formed for a clause which shares the predicate name in the head predicate with the last-mentioned clause, the second and the third fields of the clause table entry formed for each clause indicating the memory address of the head table entry formed for one of the arguments of the head predicate of the last-mentioned clause and the memory address of the body table entry formed for an optional one of the body predicates of the last-mentioned clause, said one of the arguments being the argument which stands foremost of the permutation;

the first field of the head table entry formed for each argument of each head predicate indicating the memory address of one of the head table entries formed for the last-mentioned head predicate, said one of the head table entries being the head table entry formed for the argument that stands next subsequent to the last-mentioned argument, the second field of the head table entry formed for each argument indicating the last-mentioned argument;

the first through the third fields of the body table entry formed for each predicate name of the body predicate of each clause indicating the memory adders of another of the body table entries formed for the last-mentioned clause, the last-mentioned predicate name, and the memory address of the argument table entry formed for one of the arguments of the last-mentioned body predicate, respectively, said one of the arguments being the argument which stands foremost of the permutation;

the first field of the argument table entry formed for each argument of each body predicate indicating the memory address of one of those of the argument table entries which are formed for the last-mentioned body predicate, said one of the argument table entries formed for the last-mentioned body predicate being the argument table entry formed for the argument which stands next subsequent to the last-mentioned argument in the permutation, the second field of the argument table entry formed for each argument indicating the last-mentioned argument.

* * * * *